(12) United States Patent
Nanduri et al.

(10) Patent No.: US 12,495,060 B2
(45) Date of Patent: Dec. 9, 2025

(54) SYSTEM AND METHOD FOR ASSESSING ENTITY SECURITY USING AGGREGATED DATA SOURCES

(71) Applicant: BANK OF AMERICA CORPORATION, Charlotte, NC (US)

(72) Inventors: Pradheepa Raghunaathan Nanduri, Charlotte, NC (US); Sedonami Oluwadamilola Agosa, Brooklyn, NY (US); Daniel James Doherty, Huntersville, NC (US); Zachary David Fay, Charlotte, NC (US); Andrew Braden McNab, Charlotte, NC (US); Katalina Lucia Mendoza, Charlotte, NC (US); Margaret Lee Miniati, Charlotte, NC (US); Andrew Franklin Schultz, New York, NY (US); Amy Marie Williams, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 358 days.

(21) Appl. No.: 18/117,889

(22) Filed: Mar. 6, 2023

(65) Prior Publication Data

US 2024/0305658 A1 Sep. 12, 2024

(51) Int. Cl.
*H04L 9/40* (2022.01)
*G06N 20/00* (2019.01)
*G06Q 10/0637* (2023.01)

(52) U.S. Cl.
CPC .......... *H04L 63/1433* (2013.01); *G06N 20/00* (2019.01); *G06Q 10/06375* (2013.01)

(58) Field of Classification Search
CPC ............... H04L 63/1433; G06N 20/00; G06Q 10/06375

See application file for complete search history.

(56) References Cited

U.S. PATENT DOCUMENTS

| | | | |
|---|---|---|---|
| 10,616,260 B2 * | 4/2020 | Steele | H04L 63/1441 |
| 2017/0085595 A1 * | 3/2017 | Ng | G06Q 40/06 |
| 2018/0232656 A1 * | 8/2018 | Allen | G06F 11/30 |
| 2019/0166153 A1 * | 5/2019 | Steele | H04L 63/1441 |
| 2021/0390478 A1 * | 12/2021 | Krishnamoorthy | G06Q 10/06313 |

(Continued)

*Primary Examiner* — Javier O Guzman
(74) *Attorney, Agent, or Firm* — Moore & Van Allen PLLC; Nicholas C. Russell (57) ABSTRACT

Systems, computer program products, and methods are described herein for assessing entity strategic impact using aggregated data sources. The method includes receiving at least one strategic impact indicator from each of at least two strategic impact data sources. The at least one strategic impact indicator relates to an entity strategic impact of an entity. The method also includes determining, via a machine learning model, a strategic impact confidence level for the entity. The strategic impact confidence level indicates a likelihood of an emerging strategic impact relating to the entity. The method further includes generating a strategic impact assessment report. The strategic impact assessment report indicates at least the strategic impact confidence level for the entity. The strategic impact assessment report also includes a strategic impact alert in an instance in which the strategic impact confidence level is below a threshold strategic impact level.

20 Claims, 6 Drawing Sheets

(56) References Cited

U.S. PATENT DOCUMENTS

| | | | |
|---|---|---|---|
| 2023/0419223 A1* | 12/2023 | Mueller | G06Q 10/0635 |
| 2024/0202751 A1* | 6/2024 | Coleman | G06N 20/00 |
| 2024/0273227 A1* | 8/2024 | Thompson | G06F 21/6218 |
| 2024/0314158 A1* | 9/2024 | Bourzikas | H04L 63/1441 |

* cited by examiner

SYSTEM AND METHOD FOR ASSESSING ENTITY SECURITY USING AGGREGATED DATA SOURCES

TECHNOLOGICAL FIELD

Example embodiments of the present disclosure relate generally to assessing entity strategic impact and, more particularly, to assessing entity strategic impact using aggregated data sources.

BACKGROUND

Strategic impact for an entity can be difficult to assess and/or manage. Strategic impacts can arise from a multitude of disparate source and therefore it is time consuming and difficult to analyze and assess each source in a manner to generate accurate and complete strategic impact assessments. Many different types of strategic impacts can affect a strategic impact assessment and each must be considered to maintain entity integrity and operations. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for assessing entity strategic impact using aggregated data sources is provided. The system includes at least one non-transitory storage device and at least one processing device coupled to the at least one non-transitory storage device. The at least one processing device is configured to receive at least one strategic impact indicator from each of at least two strategic impact data sources. The at least one strategic impact indicator relates to an entity strategic impact of an entity. The at least one processing device is also configured to determine, via a machine learning model, a strategic impact confidence level for the entity. The strategic impact confidence level indicates a likelihood of a strategic impact relating to the entity. The at least one processing device is further configured to generate a strategic impact assessment report. The strategic impact assessment report indicates at least the strategic impact confidence level for the entity and the strategic impact assessment report includes a strategic impact alert in an instance in which the strategic impact confidence level is below a threshold strategic impact level.

In various embodiments, the at least one processing device is configured to cause a transmission of the strategic impact assessment report to one or more devices associated with the entity. In various embodiments, the strategic impact assessment report includes at least one of the at least one strategic impact indicator used to determine the strategic impact confidence level.

In various embodiments, the at least one processing device is configured to determine a strategic impact action based on the strategic impact confidence level of the entity and the strategic impact action is based on a comparison of the strategic impact confidence level to the threshold strategic impact level. In various embodiments, the at least one processing device is configured to update the strategic impact confidence level based on one or more additional strategic impact indicator and the additional strategic impact indicator relates to the entity.

In various embodiments, the at least one processing device is configured to train the machine learning model based on one or more known strategic impact assessment reports. In various embodiments, the at least one processing device is configured to update the machine learning model based on one or more known strategic impact assessment reports.

In another example embodiment, a computer program product for assessing entity strategic impact using aggregated data sources is provided. The computer program product includes at least one non-transitory computer-readable medium having computer-readable program code portions embodied therein. The computer-readable program code portions include an executable portion configured to receive at least one strategic impact indicator from each of at least two strategic impact data sources. The at least one strategic impact indicator relates to an entity strategic impact of an entity. The computer-readable program code portions also include an executable portion configured to determine, via a machine learning model, a strategic impact confidence level for the entity. The strategic impact confidence level indicates a likelihood of an emerging strategic impact relating to the entity. The computer-readable program code portions further include an executable portion configured to generate a strategic impact assessment report. The strategic impact assessment report indicates at least the strategic impact confidence level for the entity and the strategic impact assessment report includes a strategic impact alert in an instance in which the strategic impact confidence level is below a threshold strategic impact level.

In various embodiments, the computer program product further includes an executable portion configured to cause a transmission of the strategic impact assessment report to one or more devices associated with the entity. In various embodiments, the strategic impact assessment report includes at least one of the at least one strategic impact indicator used to determine the strategic impact confidence level.

In various embodiments, the computer program product further includes an executable portion configured to determine a strategic impact action based on the strategic impact confidence level of the entity and the strategic impact action is based on a comparison of the strategic impact confidence level to the threshold strategic impact level. In various embodiments, the computer program product further includes an executable portion configured to update the strategic impact confidence level based on one or more additional strategic impact indicator and the additional strategic impact indicator relates to the entity.

In various embodiments, the computer program product further includes an executable portion configured to train the machine learning model based on one or more known strategic impact assessment reports. In various embodiments, the computer program product further includes an executable portion configured to update the machine learning model based on one or more known strategic impact assessment reports.

In still another example embodiment, a computer-implemented method for assessing entity strategic impact using aggregated data sources is provided. The method includes receiving at least one strategic impact indicator from each of at least two strategic impact data sources. The at least one strategic impact indicator relates to an entity strategic impact of an entity. The method also includes determining, via a machine learning model, a strategic impact confidence level for the entity. The strategic impact confidence level indicates a likelihood of an emerging strategic impact relating to the entity. The method further includes generating a strategic impact assessment report. The strategic impact assessment report indicates at least the strategic impact confidence level for the entity. The strategic impact assessment report includes a strategic impact alert in an instance in which the strategic impact confidence level is below a threshold strategic impact level.

In various embodiments, the method also includes causing a transmission of the strategic impact assessment report to one or more devices associated with the entity. In various embodiments, the method also includes determining a strategic impact action based on the strategic impact confidence level of the entity and the strategic impact action is based on a comparison of the strategic impact confidence level to the threshold strategic impact level.

In various embodiments, the method also includes updating the strategic impact confidence level based on one or more additional strategic impact indicator and the additional strategic impact indicator relates to the entity. In various embodiments, the method also includes training the machine learning model based on one or more known strategic impact assessment reports. In various embodiments, the method also includes updating the machine learning model based on one or more known strategic impact assessment reports.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Entity strategic impact must be monitored in real-time or near real-time in order to protect an entity from issues arising from client behaviors, competitive environment, macroeconomic environment, program execution, technology, regulatory environment, organizational health, climate, capital issues, and/or the like. An entity strategic impact assessment must consider emerging strategic impacts arising from each of these individual strategic impact areas. Current implementations of entity strategic impact assessments involve manual gathering and analysis of information related to these factors. Additionally, the manual analysis is often required to be validated through discussions amongst experts in various fields. The current process of manual review is often cumbersome and opens an entity to the possibility of missing potential information related to emerging strategic impacts or increasing nature of existing inherent strategic impacts.

Various embodiments of the present disclosure provide an automated, holistic method of assessing entity strategic impact using aggregated data sources. The system, using a machine learning model (e.g., a natural language processing (NLP) model), to receive data from multiple strategic impact data sources that assess the strategic impact level of the entity. The strategic impact data sources may include external sources, such as entity officer reports (e.g., officer memos), internal sources (e.g., entity board memo), regulatory feeds, Program Execution dashboards, voice of consumer responses, internal and external news feeds, social media feeds, research insights, newsletters, daily newsfeeds, and/or the like. Based on the strategic impact indicators provided by the strategic impact data sources, the system is configured to determine a strategic impact confidence level for the entity and the strategic impact confidence level can be monitored for potential emerging strategic impacts (e.g., the system may monitor recurring strategic impacts and/or emerging strategic impacts). For example, the system may have a strategic impact level threshold in which a strategic impact assessment report is generated in an instance in which the strategic impact confidence level falls below the strategic impact level threshold. The strategic impact assessment report may include information relating to the strategic impact and, in some instances, cause preventive actions to be executed to prevent and/or mitigate the potential emerging strategic impact. The present disclosure provides a solution to issues with processing divergent data sources in real-time without causing unnecessary strain on the network and/or processor(s).

Figure 1A:
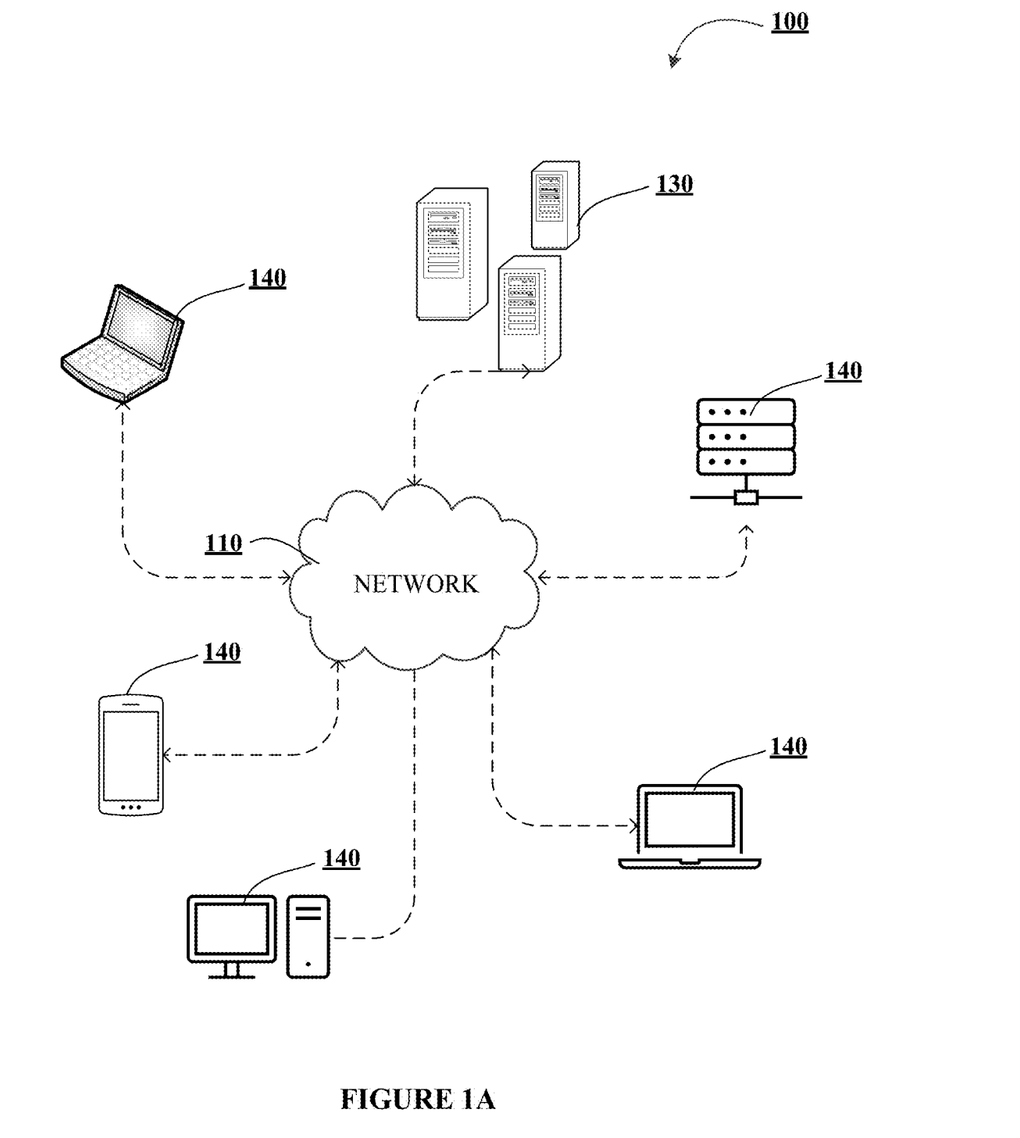
FIGS. 1A-1C illustrates technical components of an example distributed computing environment for assessing entity strategic impact using aggregated data sources, in accordance with various embodiments of the present disclosure.
Figure 1B:
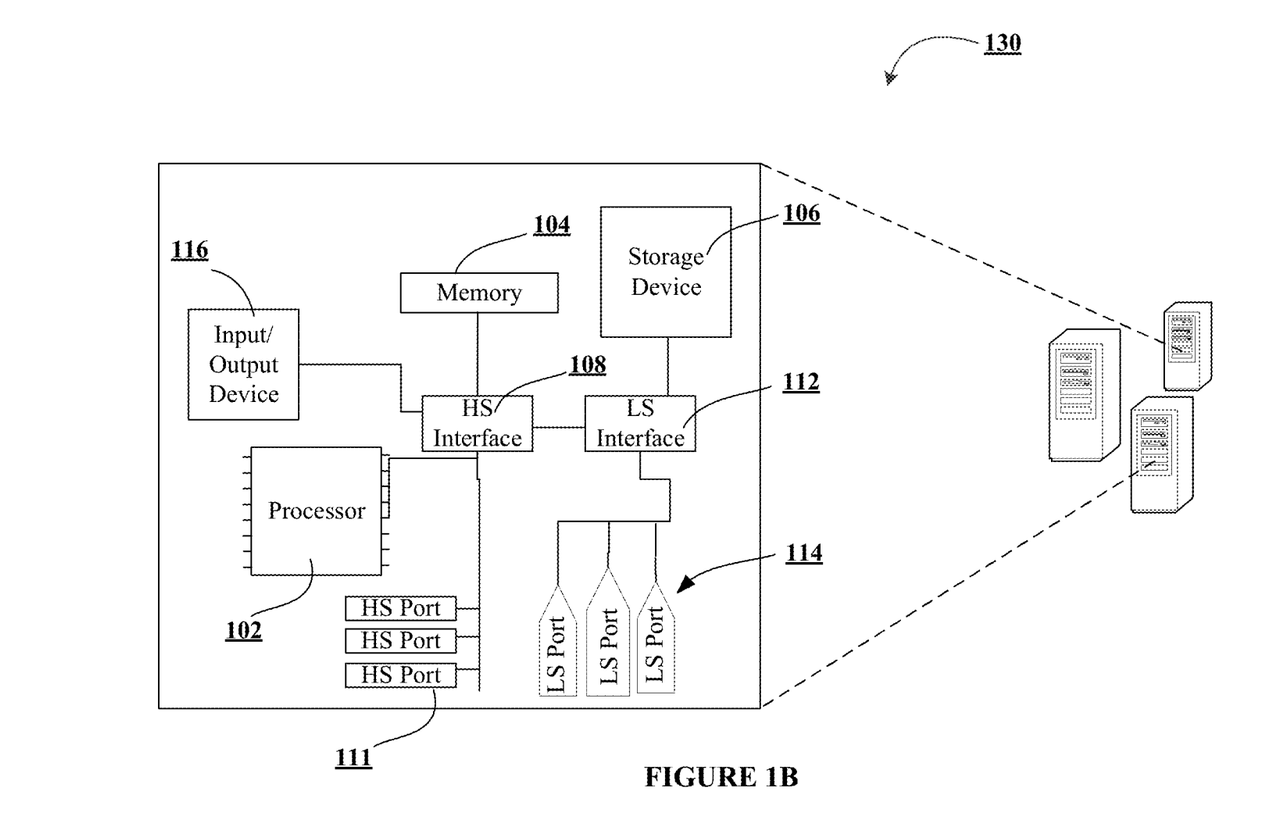
Figure 1C:
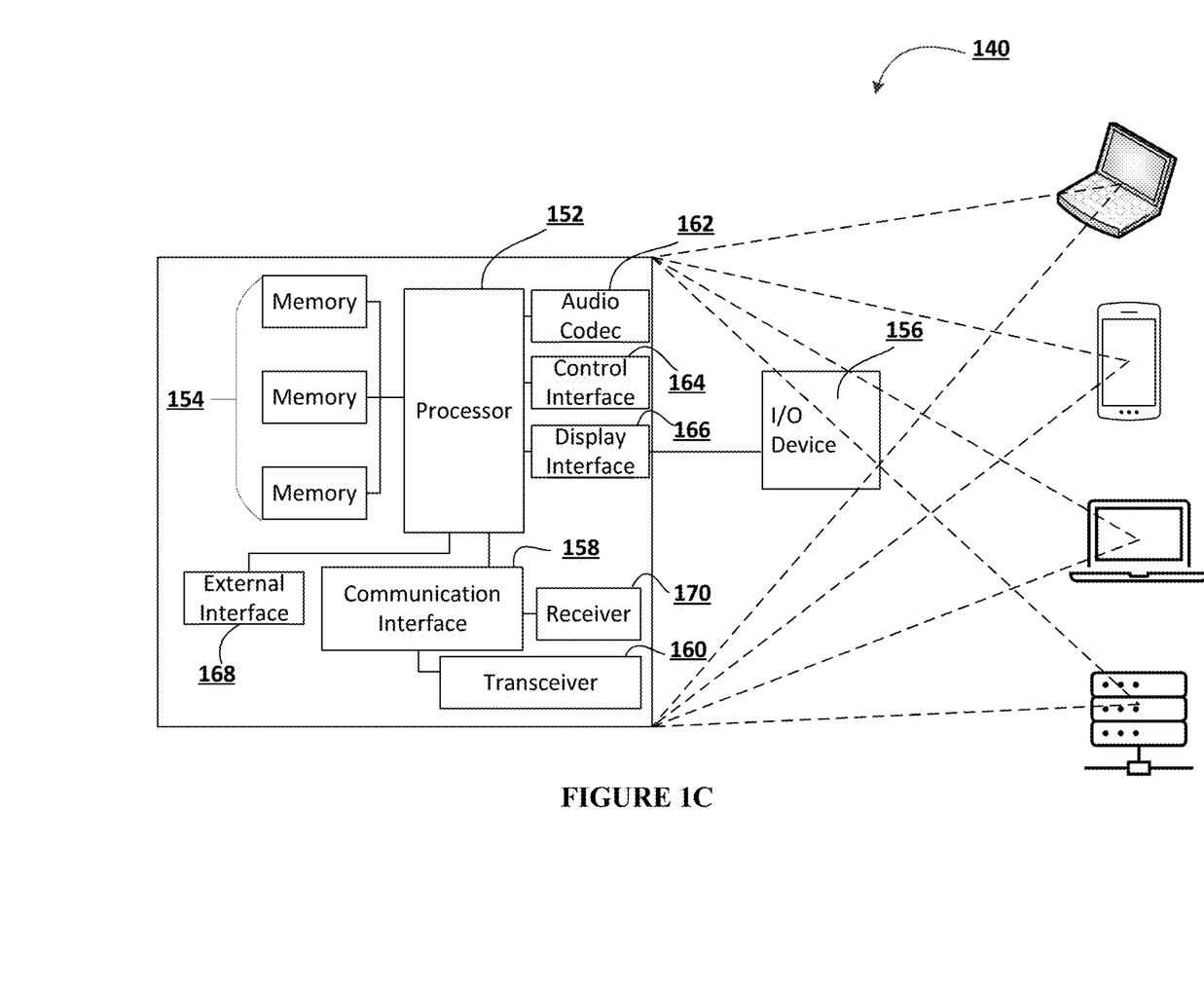

FIGS. 1A-1C illustrate technical components of an example distributed computing environment for assessing entity strategic impact using aggregated data sources, in accordance with an embodiment of the disclosure. As shown in FIG. 1A, the distributed computing environment 100 contemplated herein may include a system 130 (e.g., an entity strategic impact assessment system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be example only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an example component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is example only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an example component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location—related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
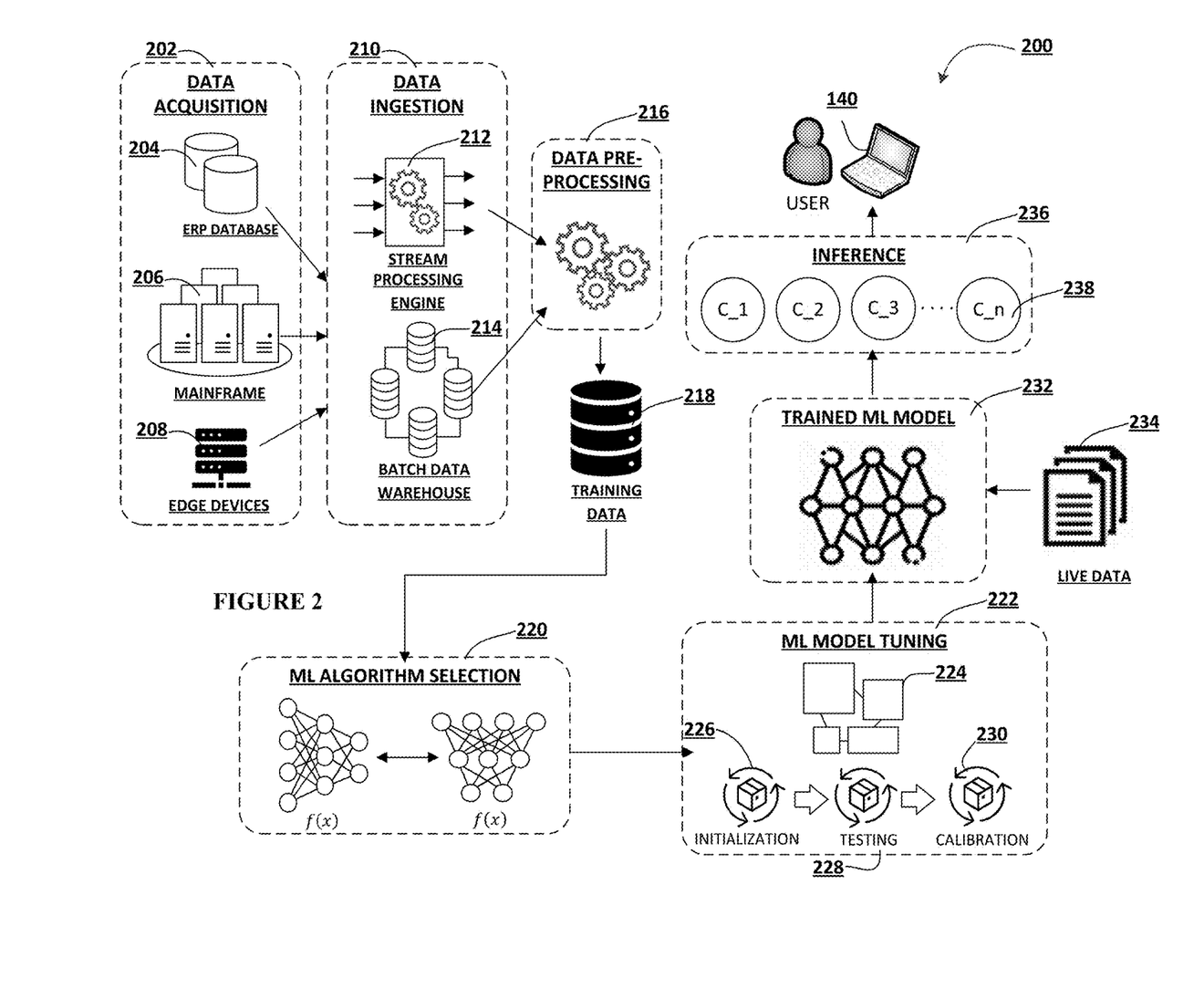
FIG. 2 illustrates an example machine learning (ML) subsystem architecture used to assess entity strategic impact using aggregated data sources, in accordance with various embodiments of the present disclosure.

FIG. 2 illustrates an example machine learning (ML) subsystem architecture 200, in accordance with an embodiment of the present disclosure. The ML subsystem architecture may be part of the components of the environment 100 (e.g., system 130). The ML subsystem architecture is used to process and analyze the strategic impact indicators discussed below in reference to FIG. 3 to determine the likelihood of an emerging strategic impact. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3:
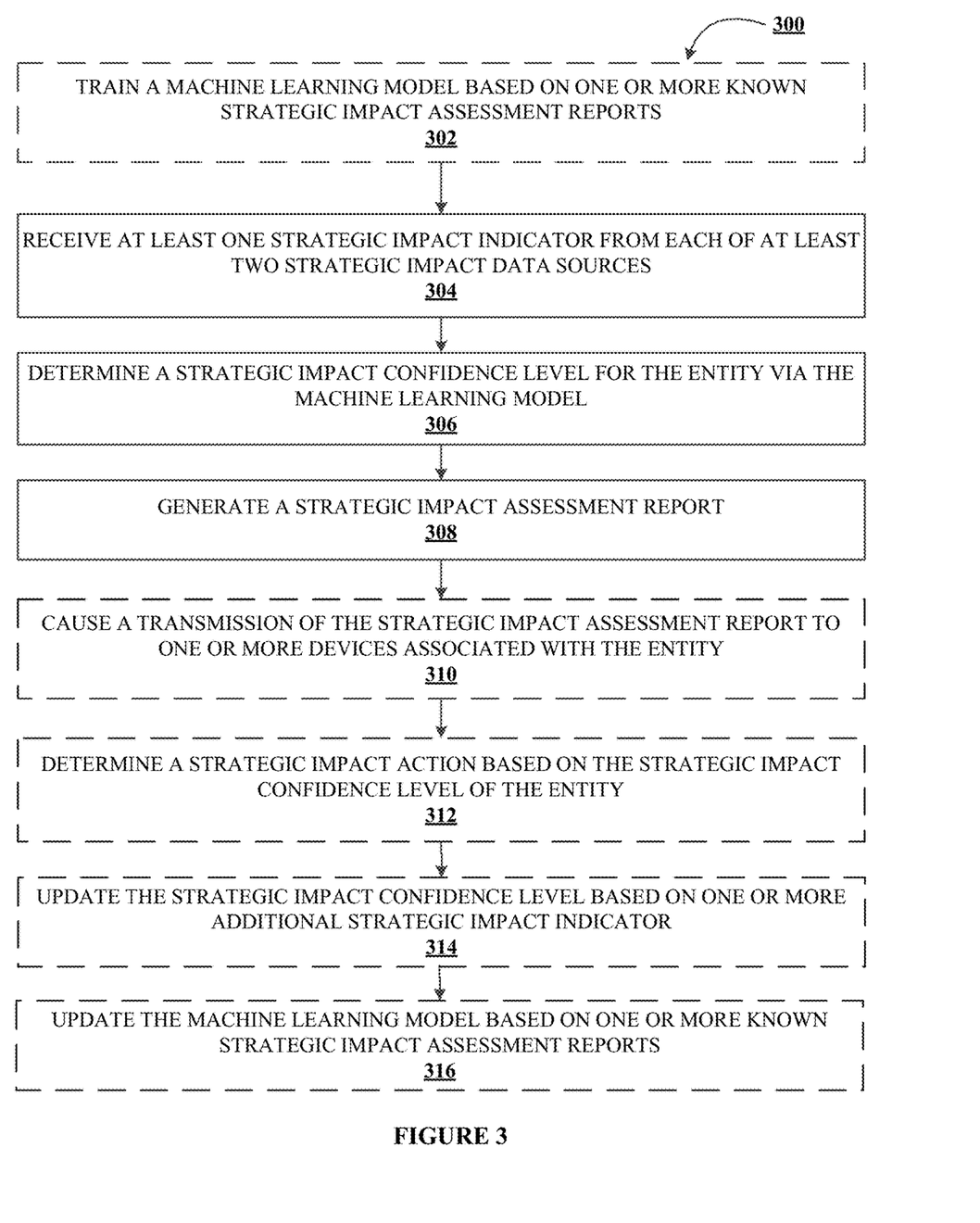
FIG. 3 illustrates a process flow for assessing entity strategic impact using aggregated data sources, in accordance with various embodiments of the present disclosure.

FIG. 3 is a flow chart 300 that illustrates another example method of assessing entity strategic impact using aggregated data sources. The method may be carried out by various components of the distributed computing environment 100 discussed herein (e.g., the system 130, one or more endpoint devices 140, etc.). An example system may include at least one non-transitory storage device and at least one processing device coupled to the at least one non-transitory storage device. In such an embodiment, the at least one processing device is configured to carry out the method discussed herein.

Referring now to optional Block 302 of FIG. 3, the method includes training a machine learning model based on one or more known strategic impact assessment reports. A known strategic impact assessment report may include any strategic impact assessment report completed prior to the training of the machine learning model. For example, an entity may have a collection of strategic impact assessment reports that were manually generated. A strategic impact assessment report includes information relating to entity strategic impact.

The machine learning model execution may be carried out by the ML subsystem architecture 200. The machine learning model may include one or more models to process and/or analyze data. The machine learning model may include natural language processing (NLP) and/or artificial intelligence. For example, the system may use the NLP model to scan information from strategic impact data sources to identify recurring themes and/or emerging patterns. Artificial Intelligence models assign weights to each of the strategic impact data sources based on frequency of occurrence from NLP output.

The machine learning model may be trained using historical data for the entity and/or similar entities. For example, the machine learning model may be provided one or more strategic impact indicators that correspond to a previous strategic impact assessment reports and use said previous strategic impact indicators to train the machine learning model for subsequent strategic impact indicators as discussed herein. The machine learning model may include NLP to process and/or analyze the historical data. The trained machine learning model may be used in various operations discussed herein.

Referring now to Block 304 of FIG. 3, the method includes receiving at least one strategic impact indicator from each of at least two strategic impact data sources. Each of the at least one strategic impact indicator relates to an entity strategic impact of an entity. The strategic impact data sources may be any source that provides information used to determine entity strategic impact. For example, the strategic impact data sources may include external sources (e.g., entity officer reports (e.g., officer memos)), internal sources (e.g., entity board memo), regulatory feeds, Program Execution dashboards, voice of consumer responses, internal and external news feeds, social media feeds, research insights, newsletters, daily newsfeeds, and/or the like. Unless otherwise stated, "entity security" corresponds to "entity strategic impact" and may relate to any strategic impacts relating to the entity.

The strategic impact indicator may include numerical values relating to emerging strategic impact levels (e.g., a numerical strategic impact level), potential types of strategic impacts (e.g., a report may include a list of top strategic impact types), vulnerable entity components (e.g., an internal report may indicate departments within an entity that are vulnerable), similar entity attacks (e.g., attempted and/or successful attacks on similar entities, such as a competitor or other entity in the same field), and/or the like. The strategic impact indicator may be data driven (e.g., data relating to potential attacks), narrative form (e.g., the NLP may analyze written reports), and/or the like. Each strategic impact indicator may be categorized based on the information included in the strategic impact indicator. For example, a strategic impact indicator relating to cybersecurity strategic impacts may receive such a categorization.

Referring now to Block 306 of FIG. 3, the method includes determining a strategic impact confidence level for the entity via the machine learning model. The strategic impact confidence level indicates a likelihood of an emerging strategic impact relating to the entity. An emerging strategic impact may be any potential attacks, weaknesses, and/or the like on the entity. Emerging strategic impacts may include physical (e.g., break-ins), economical (e.g., changes in macroeconomics or malfeasant action), virtual (e.g., network attacks), and/or the like.

The strategic impact confidence level is based at least in part on the at least one strategic impact indicator from each of at least two strategic impact data sources. The strategic impact confidence level may be generated using a weighted algorithm. In such an embodiment, each of the strategic impact indicator(s) may be provided a weighting value and then combined with one another to determine the strategic impact confidence level. The weight for each strategic impact indicator may be based on the strategic impact data source (e.g., trustworthiness of the strategic impact data source), the type of information included in the strategic impact indicator (e.g., an entity may put more emphasis on business level economic stability than physical facility strategic impacts), the relevance of the strategic impact indicator to the entity (e.g., some strategic impact indicators may be directed specifically to the entity, while others may be directed to the industry of the entity and not the entity specifically and therefore entity specific strategic impact indicators may have a higher weight than non-entity specific strategic impact indicators), and/or the like. The machine learning model may be configured to grade a strategic impact indicator for relevance, trustworthiness, and/or the like, and a weight may be assigned to the strategic impact indicator based on the grade.

In various embodiments, the strategic impact confidence level may be for the entire entity (e.g., include any strategic impacts associated with the entity). Additionally or alternatively, a single entity may have individual strategic impact confidence levels for individual sections and/or components of the entity. For example, the entity may have a strategic impact confidence level for network strategic impacts, external strategic impacts, internal strategic impacts, and/or the like. As such, the system may determine a plurality of strategic impact confidence levels for the same entity. Additionally, the strategic impact confidence level may correspond to multiple entities (e.g., entities in the same industries may be the target of similar attacks).

The strategic impact confidence level may be numerical (e.g., the strategic impact confidence level may be a numerical value between 1 and 100 with 100 being highest strategic impact level). Additionally or alternatively, the strategic impact confidence level may include non-numerical information relating to a strategic impact. For example, the strategic impact confidence level may include a ranking of strategic impact types for which the entity should be concerned (e.g., the strategic impact confidence level may indicate that a network emerging strategic impact is more substantial than a physical emerging strategic impact). Additionally, the strategic impact confidence level may include various other factors that resulted in the strategic impact confidence level. For example, the system may indicate which of the strategic impact indicators contributed the most to the strategic impact confidence level.

Referring now to Block 308 of FIG. 3, the method includes generating a strategic impact assessment report. The strategic impact assessment report indicates at least the strategic impact confidence level for the entity. In various embodiments, the strategic impact assessment report is a strategic impact alert in an instance in which the strategic impact confidence level is below a threshold strategic impact level. In such an instance, the strategic impact assessment report is produced in order to warn, prevent, and/or mitigate a potential emerging strategic impact. The strategic impact assessment report may include at least one of the at least one strategic impact indicator used to determine the strategic impact confidence level. Additionally or alternatively, the strategic impact assessment report may include information relating to the entity, such as vulnerabilities, potential targets, and/or the like. The strategic impact assessment report may indicate a strategic impact level (e.g., based on the strategic impact confidence level) that indicates the likelihood of an emerging strategic impact. For example, the strategic impact level may be high in an instance in which the strategic impact confidence level is substantially below the threshold strategic impact level.

The threshold strategic impact level may be based on the level of strategic impact tolerance or caution desired by the entity. For example, the threshold strategic impact level may be higher for an entity that has secret and/or confidential data than an entity that merely has publicly available data.

A strategic impact assessment report may also be generated in an instance in which the strategic impact confidence level is not below the threshold strategic impact level. In such an instance, the strategic impact assessment report may include information relating to one or more strategic impacts (e.g., the strategic impact assessment report may indicate that a strategic impact is not imminent but may indicate any potential issues that may be present in order to avoid later strategic impacts).

The strategic impact assessment report may be in the form of a report (e.g., a physical or virtual, such as a PDF, version). Additionally or alternatively, the strategic impact assessment report may be provided to a user interface (e.g., an entity may have a strategic impact portal that receives strategic impact assessment reports). The strategic impact assessment report may be displayed visually (e.g., via a display).

Referring now to optional Block 310 of FIG. 3, the method includes causing a transmission of the strategic impact assessment report to one or more devices associated with the entity. In various embodiments, the strategic impact assessment report may be transmitted to the entity (e.g., one or more users or devices associated with the entity), external entities (e.g., external strategic impact providers), government entities (e.g., regulators), and/or the like. In various embodiments, the strategic impact assessment report may be adjusted based on the intended recipient (e.g., the strategic impact assessment report may be scrubbed of confidential data before being sent to an external recipient).

In various embodiments, the system may be configured to produce strategic impact assessment reports that meet certain government reporting requirements. For example, a government entity may request information relating to potential entity strategic impacts (e.g., a government entity may require an entity to provide information relating to data protection) and the system can use the strategic impact indictors to produce such a report.

Referring now to optional Block 312 of FIG. 3, the method includes determining a strategic impact action based on the strategic impact confidence level of the entity. A strategic impact action may include any entity response to a strategic impact assessment. For example, a strategic impact action may include change in entity structure, decision making, and/or the like based on the operations discussed herein. The system may determine one or more strategic impact actions to warn, prevent, and/or mitigate an emerging strategic impact. In response to determining the strategic impact confidence level is below the threshold strategic impact level, the system may determine one or more actions to increase the strategic impact confidence level. The type of action may be based on the nature of the emerging strategic impact. For example, an emerging strategic impact relating to facility security (e.g., a strategic impact assessment may indicate an increase in issues for competitors in the same field as the entity) may cause the strategic impact action to be an increase in security sweeps of an area of the entity property and/or increased credential requirements. In another example, production may be adjusted based on the strategic impact assessment (e.g., production may be reduced in an instance in which the strategic assessment indicates the macroeconomic indicators are uncertain).

Referring now to optional Block 314 of FIG. 3, the method includes updating the strategic impact confidence level based on one or more additional strategic impact indicator. As the monitoring completed by the system is accomplished in real-time or near real-time, the system may also be receiving additional strategic impact indicators after the initial strategic impact confidence level is determined. Such additional strategic impact indicators may be periodic updates provided by strategic impact data sources (e.g., an external source may provide weekly or monthly memos) and/or information provided in response to the strategic impact confidence level. For example, in an instance in which the strategic impact confidence level indicates a strategic impact to economic capabilities, the system may request and/or obtain additional strategic impact indicator(s) relating specifically to economic strategic impacts.

Referring now to optional Block 316 of FIG. 3, the method includes updating the machine learning model based on one or more known strategic impact assessment reports. After a strategic impact assessment report is generated (either manually or via the process discussed herein), the strategic impact assessment may be considered a known strategic impact assessment report and may be used to update the machine learning model. The machine learning model may be updated in the same fashion as the initial training (e.g., the machine learning model is feed information relating to known strategic impact assessment reports). The machine learning model may be constantly and/or periodically updated to maintain accurate performance (e.g., strategic impact assessments may evolve and/or change over time).

Figure 4:
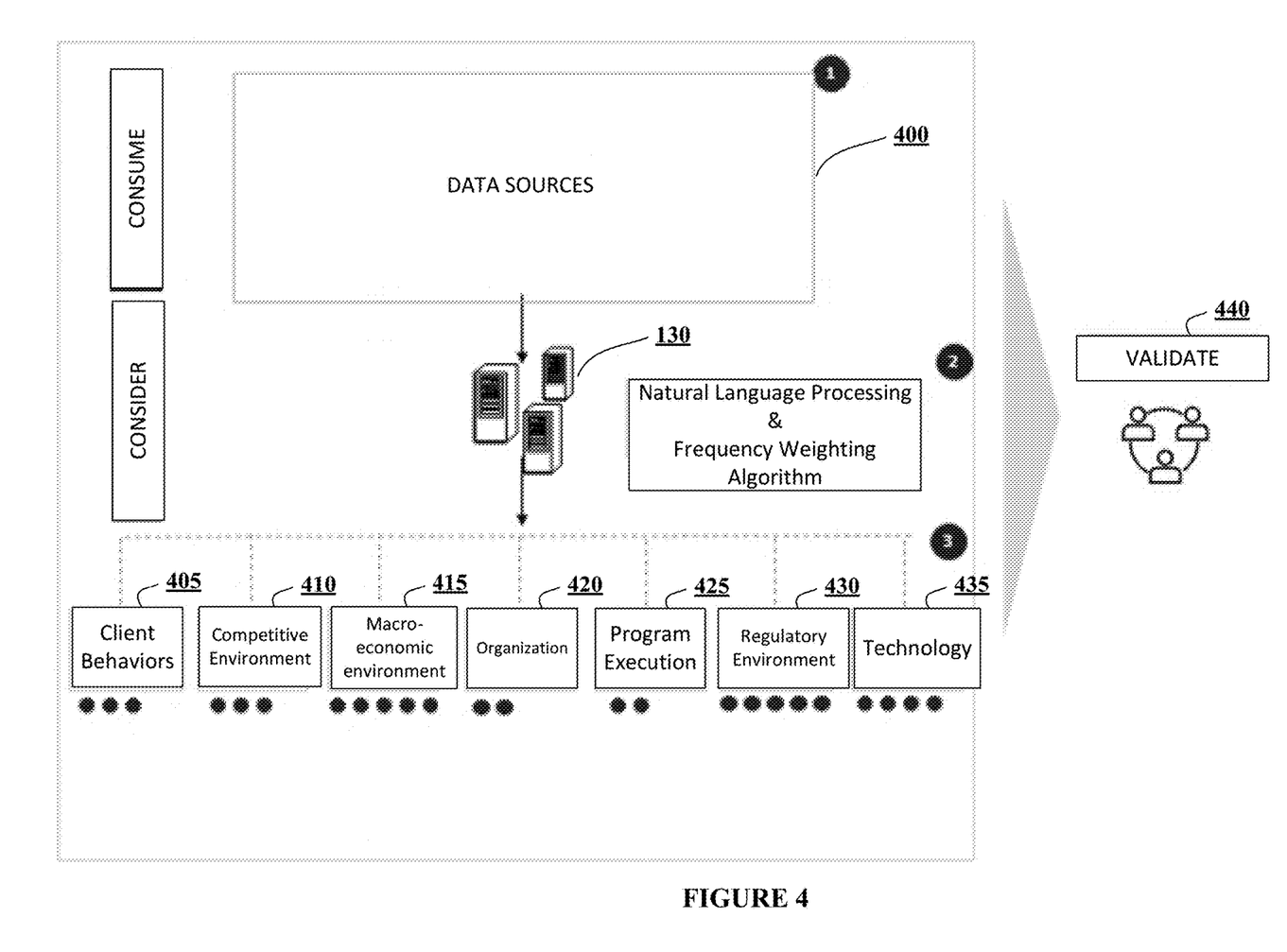
FIG. 4 illustrates a data flow diagram of an example embodiment of assessing entity strategic impact using aggregated data sources, in accordance with various embodiments of the present disclosure.

Referring now to FIG. 4, a data flow diagram of an example embodiment of assessing entity strategic impact using aggregated data sources is provided. As shown, the system 130 receives information (e.g., strategic impact indicators) from data sources 400. Example strategic impact indicators may include client behaviors 405, competitive environment information 410, macroeconomic environment information 415, organizational information 420, program execution information 425, regulatory environment information 430, and/or technology information 435.

Each of the strategic impact indicators may be given a weight. For example, each of the strategic impact indicators is given a weight between 1 and 5 to be used in determining the strategic impact confidence level (e.g., client behaviors 405 has a weight of three, competitive environment information 410 has a weight of three, macroeconomic environment information 415 has a weight of five, organizational information 420 has a weight of two, program execution information 425 has a weight of two, regulatory environment information 430 has a weight of five, and technology has a weight of four). As such, the higher the weight, the more important the strategic impact indicator is in determining the strategic impact confidence level. The weight may be manually defined (e.g., an entity may prefer to give more weight to certain strategic impact indicator types than others) and/or via machine learning model processing (e.g., as discussed herein, the machine learning model may be trained and/or updated using historical data and such training may also include assigning weights to different types of strategic impact indicators and/or strategic impact data sources to be used in processes discussed herein).

The system may be configured to product a strategic impact confidence level based on the strategic impact indicators received and the strategic impact confidence level may be analyzed and/or validated as shown in block 440. For example, an entity expert may analyze the results and determine any additional actions that may necessary. Additionally, user input may be used to train the machine learning model. For example, an entity expert may recognize an error in the machine learning model (e.g., a strategic impact indicator may be given too little or too much weight) and may adjust the strategic impact confidence level based on the difference. In some instances, the validation may be carried out in real-time (e.g., an expert may be monitoring the strategic impact confidence level). Additionally or alternatively, the validation may be carried out post-hoc in order to update the machine learning model. For example, the validation may grade the strategic impact confidence level output based on the actual results (e.g., whether or not an emerging strategic impact was imminent).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain example embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for assessing entity strategic impact using aggregated data sources, the system comprising:
   at least one non-transitory storage device; and
   at least one processing device coupled to the at least one non-transitory storage device, wherein the at least one processing device is configured to:
   receive at least one strategic impact indicator from each of at least two strategic impact data sources, wherein the at least one strategic impact indicator relates to an entity strategic impact of an entity, wherein the at least two strategic impact data sources comprise at least one of entity office memos, entity board memo, regulatory feeds, newsletters, program execution dashboards, and consumer responses;
   assign a weight for the at least one strategic impact indicator received from each of the at least two strategic impact data sources, wherein the weight is based on strategic source reliability, type of information in the at least one strategic impact indicator, and relevance of the at least one strategic impact indicator to the entity;

determine, via a machine learning model, a strategic impact confidence level for the entity, via a weighted algorithm, based at least on the weight of the at least one strategic impact, wherein the strategic impact confidence level indicates a likelihood of an emerging strategic impact relating to the entity; and generate a strategic impact assessment report, wherein the strategic impact assessment report indicates at least the strategic impact confidence level for the entity, and wherein the strategic impact assessment report comprises a strategic impact alert in an instance in which the strategic impact confidence level is below a threshold strategic impact level.

2. The system of claim 1, wherein the at least one processing device is configured to cause a transmission of the strategic impact assessment report to one or more devices associated with the entity.

3. The system of claim 1, wherein the strategic impact assessment report comprises at least one of the at least one strategic impact indicator used to determine the strategic impact confidence level.

4. The system of claim 1, wherein the at least one processing device is configured to determine a strategic impact action based on the strategic impact confidence level of the entity, wherein the strategic impact action is based on a comparison of the strategic impact confidence level to the threshold strategic impact level.

5. The system of claim 1, wherein the at least one processing device is configured to update the strategic impact confidence level based on one or more additional strategic impact indicator, wherein the additional strategic impact indicator relates to the entity.

6. The system of claim 1, wherein the at least one processing device is configured to train the machine learning model based on one or more known strategic impact assessment reports.

7. The system of claim 1, wherein the at least one processing device is configured to update the machine learning model based on one or more known strategic impact assessment reports.

8. A computer program product for assessing entity strategic impact using aggregated data sources, the computer program product comprising at least one non-transitory computer-readable medium having computer-readable program code portions embodied therein, the computer-readable program code portions comprising:

an executable portion configured to receive at least one strategic impact indicator from each of at least two strategic impact data sources, wherein the at least one strategic impact indicator relates to an entity strategic impact of an entity, wherein the at least two strategic impact data sources comprise at least one of entity office memos, entity board memo, regulatory feeds, newsletters, program execution dashboards, and consumer responses;

an executable portion configured to assign a weight for the at least one strategic impact indicator received from each of the at least two strategic impact data sources, wherein the weight is based on strategic source reliability, type of information in the at least one strategic impact indicator, and relevance of the at least one strategic impact indicator to the entity;

an executable portion configured to determine, via a machine learning model, a strategic impact confidence level for the entity, via a weighted algorithm, based at least on the weight of the at least one strategic impact, wherein the strategic impact confidence level indicates a likelihood of an emerging strategic impact relating to the entity; and an executable portion configured to generate a strategic impact assessment report, wherein the strategic impact assessment report indicates at least the strategic impact confidence level for the entity, and wherein the strategic impact assessment report comprises a strategic impact alert in an instance in which the strategic impact confidence level is below a threshold strategic impact level.

9. The computer program product of claim 8, wherein the computer program product further comprises an executable portion configured to cause a transmission of the strategic impact assessment report to one or more devices associated with the entity.

10. The computer program product of claim 8, wherein the strategic impact assessment report comprises at least one of the at least one strategic impact indicator used to determine the strategic impact confidence level.

11. The computer program product of claim 8, wherein the computer program product further comprises an executable portion configured to determine a strategic impact action based on the strategic impact confidence level of the entity, wherein the strategic impact action is based on a comparison of the strategic impact confidence level to the threshold strategic impact level.

12. The computer program product of claim 8, wherein the computer program product further comprises an executable portion configured to update the strategic impact confidence level based on one or more additional strategic impact indicator, wherein the additional strategic impact indicator relates to the entity.

13. The computer program product of claim 8, wherein the computer program product further comprises an executable portion configured to train the machine learning model based on one or more known strategic impact assessment reports.

14. The computer program product of claim 8, wherein the computer program product further comprises an executable portion configured to update the machine learning model based on one or more known strategic impact assessment reports.

15. A computer-implemented method for assessing entity strategic impact using aggregated data sources, the method comprising:

receiving at least one strategic impact indicator from each of at least two strategic impact data sources, wherein the at least one strategic impact indicator relates to an entity strategic impact of an entity, wherein the at least two strategic impact data sources comprise at least one of entity office memos, entity board memo, regulatory feeds, newsletters, program execution dashboards, and consumer responses;

assigning a weight for the at least one strategic impact indicator received from each of the at least two strategic impact data sources, wherein the weight is based on strategic source reliability, type of information in the at least one strategic impact indicator, and relevance of the at least one strategic impact indicator to the entity;

determining, via a machine learning model, a strategic impact confidence level for the entity, via a weighted algorithm, based at least on the weight of the at least one strategic impact, wherein the strategic impact confidence level indicates a likelihood of an emerging strategic impact relating to the entity; and generating a strategic impact assessment report, wherein the strategic impact assessment report indicates at least the strategic impact confidence level for the entity, and wherein the strategic impact assessment report comprises a strategic impact alert in an instance in which the strategic impact confidence level is below a threshold strategic impact level.

16. The method of claim 15, further comprising causing a transmission of the strategic impact assessment report to one or more devices associated with the entity.

17. The method of claim 15, further comprising determining a strategic impact action based on the strategic impact confidence level of the entity, wherein the strategic impact action is based on a comparison of the strategic impact confidence level to the threshold strategic impact level.

18. The method of claim 15, further comprising updating the strategic impact confidence level based on one or more additional strategic impact indicator, wherein the additional strategic impact indicator relates to the entity.

19. The method of claim 15, further comprising training the machine learning model based on one or more known strategic impact assessment reports.

20. The method of claim 15, further comprising updating the machine learning model based on one or more known strategic impact assessment reports.

* * * * *